The specification in this patent is not in print.
6885X
A. BULL.
Cordage.
Patented Dec. 29, 1831.
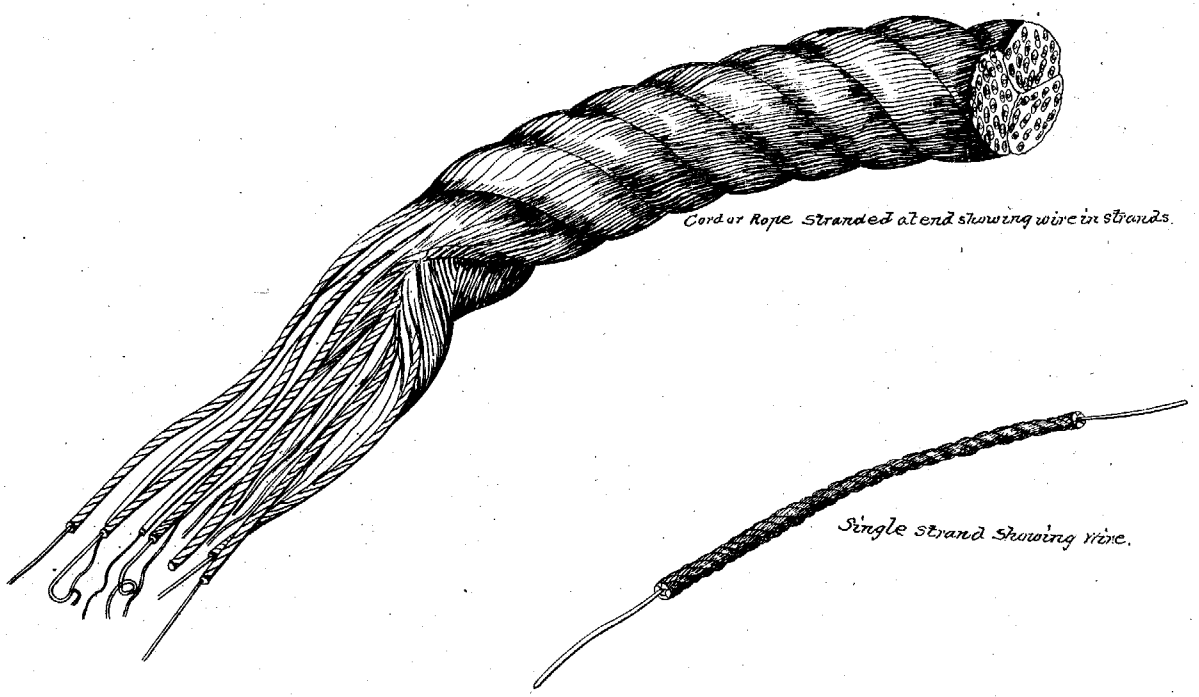
THE NORRIS PETERS CO., WASHINGTON, D. C.

Dec. 29. 1831 — [illegible] — 25.

6885X
12/29/1831

Aaron Bull. of Caroline State of New York.

Letters Patent.

The schedule referred to in these Letters Patent and making part of the same containing a description in the words of the said Aaron Bull himself of his improvement in making Rope, Cords, Cables, Towlines and Cordage in general.

Take threads sufficient to make a strand to form the rope the size you wish it. Lay wire in the centre of the strand forming a heart of wire. When laying the wire in the strands if but one is used to prevent twisting the wire, fasten it to a lope at the end of the wire from the lay which will run the twist out of the wire as the strands are laid up.

Then lay up your several strands together in the usual way of making a cord or rope. What I particularly claim is the manner of constructing the rope as above described.

Dated New York 19th Nov. 1831

Witnesses
Richard Barr
H. C. Allen

Aaron Bull.

192 [illegible]

[illegible]